Jan. 7, 1941.   R. A. NEMANICK   2,227,759
SEED PLANTER
Filed Aug. 28, 1939

INVENTOR
Ralph A. Nemanick
BY
John A. Naismith
ATTORNEY

Patented Jan. 7, 1941

2,227,759

UNITED STATES PATENT OFFICE 2,227,759

SEED PLANTER

Ralph A. Nemanick, Salinas, Calif.

Application August 28, 1939, Serial No. 292,237

2 Claims. (Cl. 111—86)

The present invention relates particularly to that type of devices used for the planting of small seed, such as carrot seed, in large fields.

Under conditions heretofore existing it has been the custom to deposit the seed on the ground between the sides of a plow-like shoe, the soil supposedly closing in over the seed as the shoe progressed therethrough. In such devices the spreading of the seed has been so lacking in uniformity that much of the seed would lie in thick parallel rows on either side of the center of the shoe, and some of it would not be covered with soil at all but would be spread over the surface of the soil lying rearwardly of the shoe.

The uneven distribution of the seed is of vital importance to the rancher who grows carrots on a large scale, largely because of the resulting complete lack of uniformity of size in the carrots produced. It is obvious that where the seed is bunched the resulting carrots will be crowded and present all stages of maturity when plowed up. Again, while the seed falling into the moist soil beneath the surface and well covered over, will germinate promptly, the seed falling on to the surface of the soil rearwardly of the shoe, which is dry, cannot germinate until the soil is irrigated. Since this seed germinates at a later period than the seed deposited under the surface it is clear that when the crop is harvested a very large percentage of it will be undersized because of this lateness in germinating.

It is, therefore, the object of my invention to provide a planting device so constructed and arranged that the seed passed therethrough will be substantially uniformly and entirely distributed beneath the surface of the soil whereby a greater uniformity in the size of the resulting vegetables will be obtained.

Figure 1:
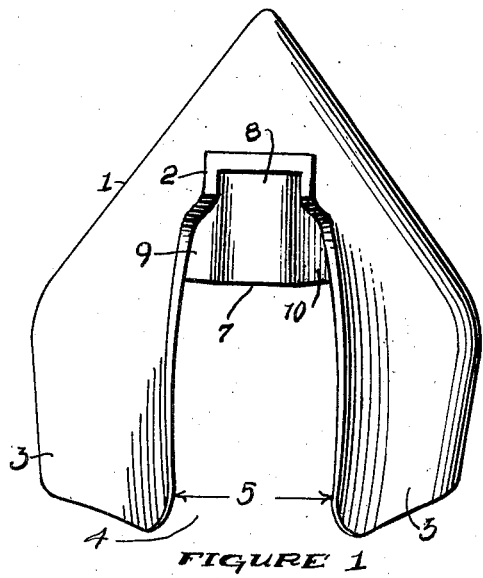
Figure 1 is a top plan view of a device embodying my invention.
Figure 4:
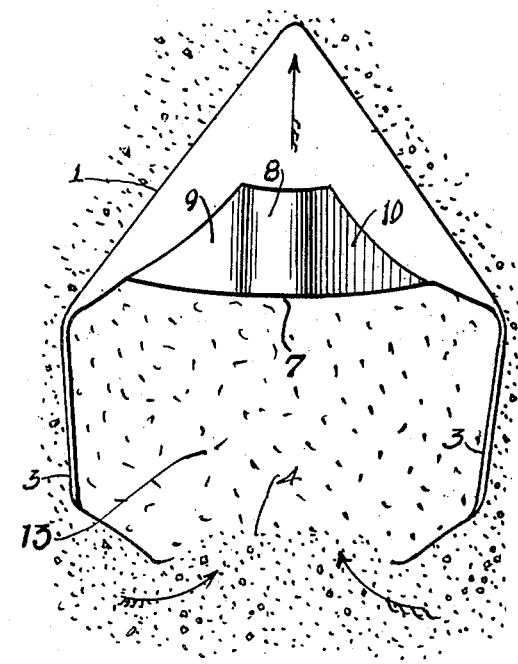
Figure 4 is a diagrammatical illustration showing the device in operation.
Figure 2:
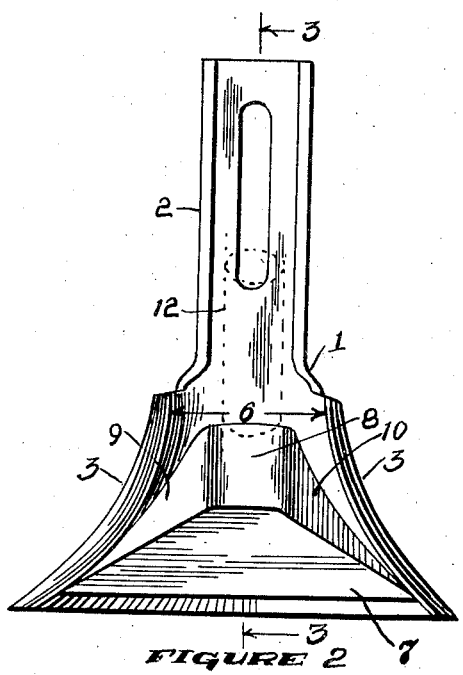
Figure 2 is a rear elevational view of the same.
Figure 3:
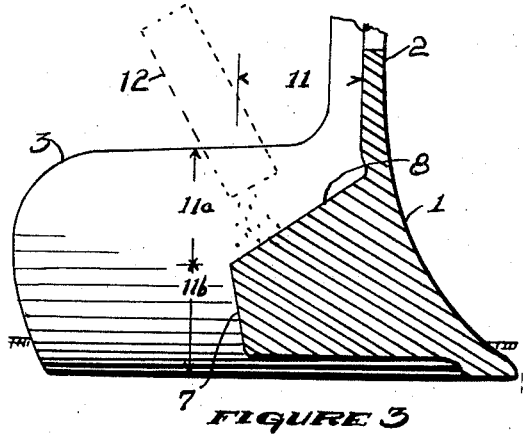
Figure 3 is a sectional view on line 3—3 of Figure 2.

Referring now more particularly to the drawing, I show at 1 a planter shoe of ordinary shape and construction insofar as the front body portion is concerned, and provided with the usual arm 2 by means of which it is supported on the seed supplying vehicle.

The side wings 3 are identical in form and size and are shaped to receive the soil raised by the shoe and drop it back over the underlying soil at 4.

Since the proper covering of all of the seed deposited is one of the important functions of the device, it is pointed out that the wings 3 above referred to converge slightly from the center of the shoe rearwardly as indicated at 5, and also converge upwardly as at 6. By means of this formation the soil raised by the forward portion of the shoe merely passes around the sides of the shoe and drops back to substantially its former position over the seed that has been deposited between the wings.

Formed preferably as an integral part of the shoe, and positioned between the two wings 3 immediately back of the soil-raising point of the shoe, is a seed spreader indicated generally at 7. The top surface of the spreader is provided with a somewhat flattened and rearwardly and downwardly inclined central portion as 8, and laterally and downwardly inclined side portions as 9 and 10.

In order to more clearly define the positioning and the proportions of the spreader, it is pointed out that in top plan view the distance 11 is substantially equal to each of the distances 11a and 11b, which latter characters indicate the position of the rear edge of the center surface portion 8, relative to the top and bottom levels of the shoe. This arrangement places all of the top surface of the spreader well above the surface of the underlying soil, and renders the convex facing surfaces of the wings highly useful in the distribution of the seed.

When the device is in use the seed first falls on the central surface portion 8 of the spreader from a chute indicated in part in dotted lines at 12. While some of the seed strikes this central flattened portion of the spreader, other seed, probably influenced by the vibration of the mechanism when in motion, falls upon the surfaces 9 and 10. The seed, being light and falling with considerable force, rebounds at an angle determined by the position of the particular portion of the surface upon which it falls and the direction of movement of the seed before striking that surface.

While the distribution of the seed is initiated in the manner above set forth, it is completed by a portion of the seed rebounding from the surfaces 8, 9 and 10 striking the curvilinear inner surfaces of the two wings 3 and again rebounding to the soil.

Since the surfaces 8, 9 and 10 are all inclined rearwardly and downwardly a portion of the seed striking the same will rebound directly to the soil, and since the inner surfaces of the wings 3 curve inwardly it follows that the seed deflected to the same will rebound in all directions and be quite evenly distributed over the soil as indicated clearly at 13.

The general relative proportions of the several parts is of great importance because they cooperate to distribute the seed over the soil between the two wings 3 so all of the seed may be properly covered by the soil closing in at 4. In this connection it should be stated that during the planting of seed the shoe is in constant motion, and it is therefore necessary that the seed come to rest before the wings 3 pass by.

Although a certain specific embodiment of the invention has been illustrated and described, it will be understood that various alterations in the details of construction and mode of assembly and operation may be made without departing from the scope of the invention as indicated in the appended claims.

I claim:

1. A seed planter shoe having a symmetrical generally plow-like conformation and having symmetrically disposed soil engaging wings extending rearwardly on either side of its center line of travel, said wings being divergent throughout a portion of their length and then converging toward their rear ends, and curving inwardly and upwardly throughout their length to form opposed curvilinear seed-deflecting surfaces, and a member inserted between the diverging portions of the wings and below their top edges, the top surface of the member having a rearwardly and downwardly inclined and somewhat flattened central portion and laterally and downwardly inclined side portions whereby to deflect seed falling thereon both rearwardly to the soil or angularly laterally to the wing surfaces and thence to the ground.

2. A seed planter shoe having a symmetrical generally plow-like conformation and having symmetrically disposed soil engaging wings extending rearwardly on either side of its center line of travel, and a member inserted between the said wings and below their top edges and immediately back of the shoe point, the top surface of the member having a rearwardly and downwardly inclined and somewhat flattened central portion and laterally and downwardly inclined side portions, whereby to deflect seed falling thereon both rearwardly to the soil or angularly laterally to the wing surfaces and thence to the ground.

RALPH A. NEMANICK.